Oct. 4, 1960   A. ANDERSON ET AL   2,954,976
SHEET FEEDERS
Filed May 2, 1958   5 Sheets-Sheet 1

Inventors
Alfred Anderson
Eugene A. Anderson
By Mann, Brown & McWilliams
Attorneys

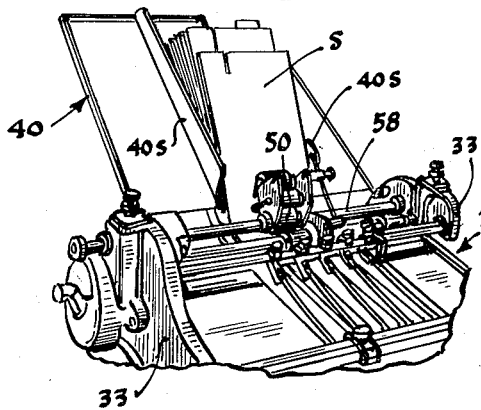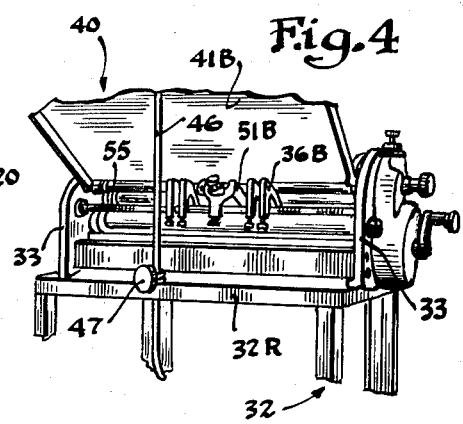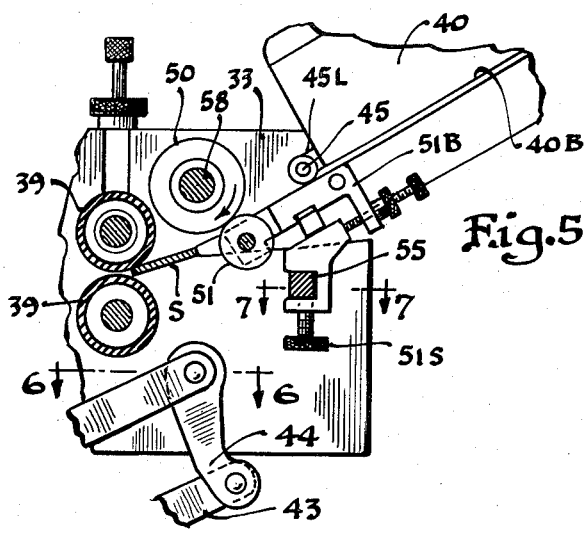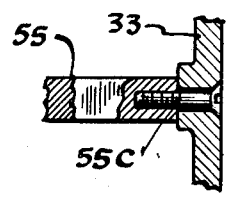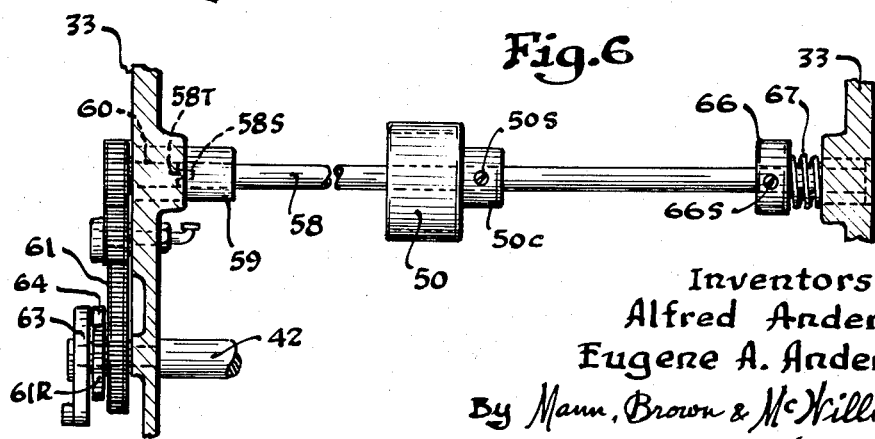
Inventors
Alfred Anderson
Eugene A. Anderson
By Mann, Brown & McWilliams
Attorneys

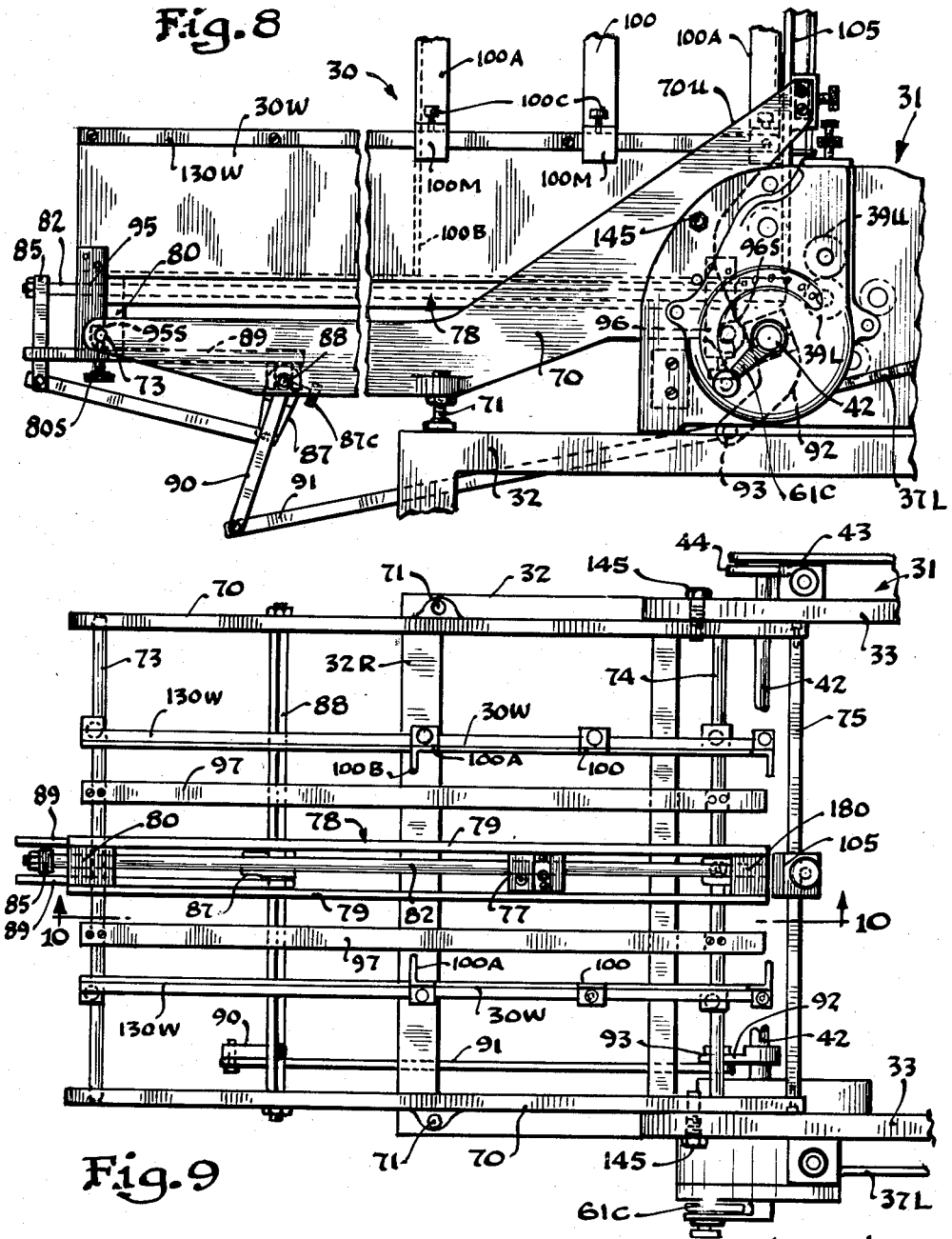

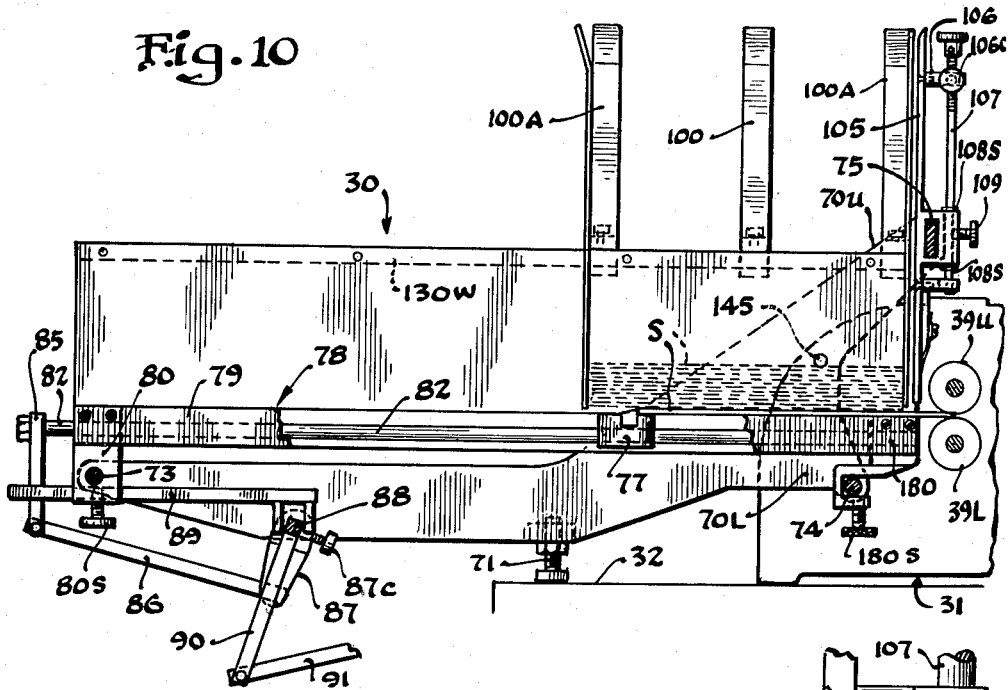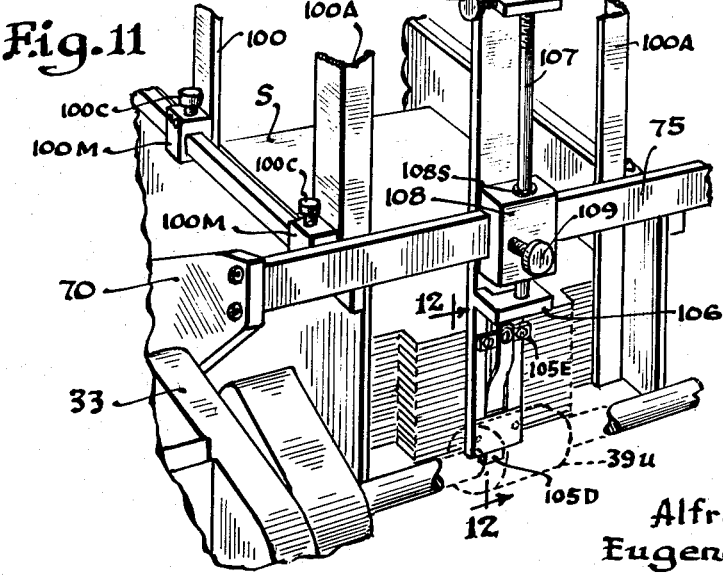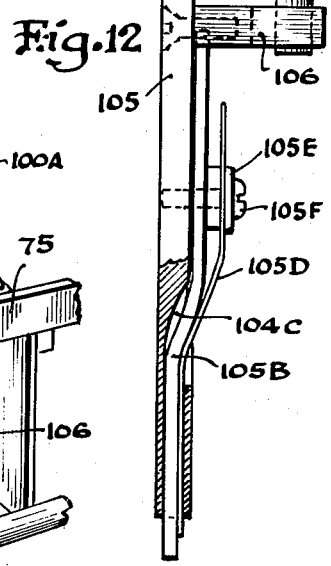

Oct. 4, 1960 A. ANDERSON ET AL 2,954,976
SHEET FEEDERS
Filed May 2, 1958 5 Sheets-Sheet 5

Inventors
Alfred Anderson
Eugene A. Anderson
By Mann, Brown & McWilliams
Attorneys

United States Patent Office 2,954,976
Patented Oct. 4, 1960

2,954,976

SHEET FEEDERS

Alfred Anderson, 460 S. York Road, Elmhurst, Ill., and Eugene A. Anderson, 414 W. Taylor Road, Lombard, Ill.

Filed May 2, 1958, Ser. No. 732,516

11 Claims. (Cl. 271—10)

This invention relates to article or sheet feeders and particularly to feeders of the kind used in feeding carton blanks, folded cartons, sheets and the like to printing presses.

Feeders of the aforesaid character have heretofore been made and used in several different kinds or types, one of which is a top feed type such as the friction feeder shown in Alfred Anderson Patent No. 2,696,983, patented December 14, 1954 and Alfred Anderson Patent No. 2,733,919, patented February 7, 1956. Another common type of sheet feeder which is used primarily where heavy stock, carton blanks or the like are to be fed is known as a bottom feed or shuttle feed. In the past where it has been desired to feed a wide variety of sheets or other articles it has been necessary to have different feeders having the bottom feed arrangement and the top feed arrangement, and when a change in the type of feeder was desired it has been necessary to detach one type of feeder from the printing machine and to then attach the other type of feeder.

In view of the foregoing it is the primary object of the present invention to provide a sheet feeder that is adapted for conversion to either a bottom feed or a top feed type of operation, and a related object is to accomplish this in such a way that the major portions of a basic sheet feeder may remain in their usual relationship to a printing machine or the like and the conversion or adaptation of this basic unit in either top or bottom feed operation involves merely the substitution of different hoppers and different sheet separating means which are then operated from mechanism in the basic portion of the feeder.

Another important object of the present invention is to provide a bottom feed sheet feeder of an improved and simplified construction which is particularly adapted for use with a wide variety of articles or sheets and which accomplishes the sheet separating function in an unusually efficient manner.

Other and further objects of the present invention will be apparent from the following description and claims, and are illustrated in the accompanying drawings, which, by way of illustration, show a preferred embodiment of the present invention and the principles thereof, and what is now considered to be the best mode in which to apply these principles. Other embodiments of the invention embodying the same or equivalent principles may be used and structural changes may be made as desired by those skilled in the art without departing from the invention.

In the drawings:

Fig. 3 is a front perspective view of a portion of the sheet feeder as it is adapted for top feed operation;

Fig. 4 is a fragmentary rear perspective view of the structure shown in Fig. 3;

Fig. 5 is a vertical sectional view through the hopper and sheet separating mechanism of Fig. 3;

Fig. 6 is a horizontal sectional view taken substantially along the line 6—6 of Fig. 5;

Fig. 7 is a fragmentary horizontal sectional view taken substantially along the line 7—7 of Fig. 5;

Fig. 8 is a side elevational view of the feeder that is shown in Fig. 1;

Fig. 9 is a plan view of a structure shown in Fig. 8;

Fig. 10 is a vertical sectional view taken substantially along the line 10—10 of Fig. 9;

Fig. 11 is a fragmentary perspective view taken from the front of the bottom feed hopper of Fig. 10;

Fig. 12 is a vertical sectional view taken substantially along the line 12—12 of Fig. 11;

Figure 14:
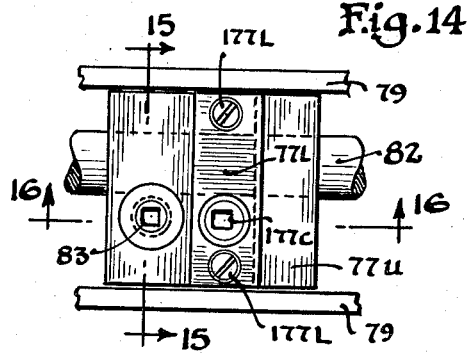
Fig. 14 is an enlarged plan view of the shuttle.
Figure 15:
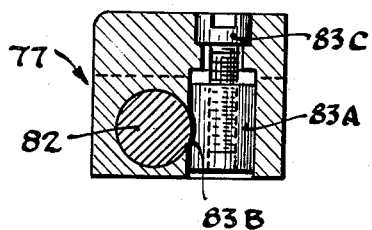
Figure 16:
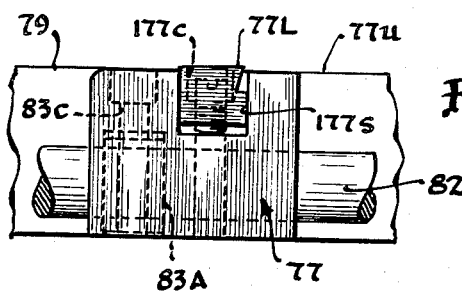

Figs. 15 and 16 are vertical sectional views taken substantially along the lines 15—15 and 16—16 of Fig. 14.

For purposes of disclosure the invention is herein illustrated as embodied in a sheet feeder 20 that is associated with a rotary printing machine 21 so that the sheet feeder may operate to separate articles such as cartons, carton blanks or sheets S from a stack and feed such sheets S one-by-one to the printing machine 21. The feeder 20, according to the present invention, is convertible in character so that it may be used for bottom feed operation where the sheets are separated from the bottom of a stack, or for top feed operation where the sheets are separated one-by-one from the top of a stack of sheets.

The feeder 20 that is herein shown is basically like the sheet feeder shown in the aforesaid Anderson patents, and it will be noted that the sheet feeder shown in such prior patents is operable only for feeding sheets one-by-one from the top of a stack. The present invention is concerned with imparting convertibility to sheet feeders of the aforesaid character so that the same basic feeder unit may be used for either top feed or bottom feed operation. Such conversion, in a broad sense, involves the substitution of different hoppers and different sheet separating means so that the sheet separating means may be operated from the same actuating mechanism of the basic sheet feeder.

In Figs. 1, 2 and 8 to 15 the sheet feeder 20 is illustrated with a bottom feed unit 30 shown in association with the feeder 20 and as there shown the feeder 20 comprises a basic unit 31 supported on a frame 32 that is generally table-like in form.

In Figs. 3 to 7 of the drawings the feeder is shown as it is adapted for top feed operation, and in this form the feeder has a supply mechanism 40 that has sheet separating means associated therewith, as will be described.

The basic unit 31 of the feeder is in most respects generally like the corresponding portions of the sheet feeder shown in the aforesaid Anderson patents, and the basic unit 31 thus includes spaced side frames 33 between which a horizontal feed table 34 is provided, and a continuously operating belt conveyor is afforded on this table by belts 35 and resilient hold-down strips 36. The basic unit 31 also has a jogger 37 located over the feed table 34 and operated as described in said Anderson patents, and sheets that are separated and fed from either of the units or hoppers 30 or 40 are arranged to be advanced one-by-one in a forward direction over the feed table by the belts 35 and to the printing machine 21.

Figure 2:
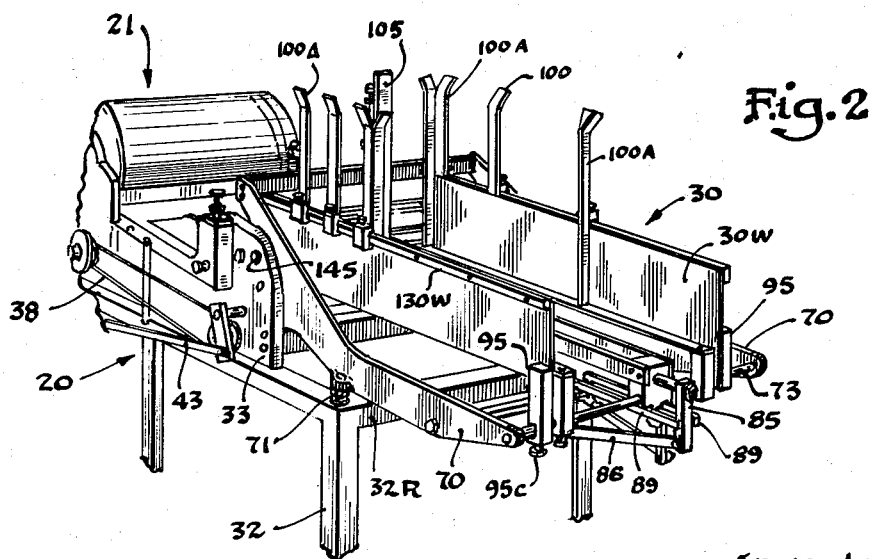
Fig. 2 is a rear elevational view of the sheet feeder of Fig. 1.

The belts 35 of the conveyor are driven from the printing machine 21 by a belt 38, Fig. 2, and this constant drive also serves so as to operate a pair of pull-out rollers 39U or 39L, Fig. 5, that are located and operated in the same general manner as in the aforesaid Anderson patents. These pull-out rollers, as will be described in further detail hereinafter, receive the individual sheets that are separated and fed from the hopper, and the pull-out rollers 39 advance the sheets into cooperation with the conveyor belts 35 so that their advancing movement may thereafter be derived from the belts.

The basic unit 31 also includes a rock shaft 42 that extends transversely between the side frames 33 and is operated in time relationship to the printing machine 21 by means including a connecting link 43 and an arm 44, Figs. 2 and 5, and this operating or timing connection is substantially the same as the corresponding connection in the aforesaid Anderson patents.

Under the present invention the sheet separating means in both the top feed and bottom feed operation are actuated by the rock shaft 42, and this will be described in some detail hereinafter.

Thus, with particular reference to the top feed operation of the feeder 20 as illustrated in Figs. 3 to 7 of the drawings, it may be pointed out that the sheet separating means employed under the present invention is basically like the sheet separating means of the aforesaid Anderson patents but with some revisions, as will be explained. The top feed arrangement that is shown in Figs. 3 to 7 includes the hopper 40 which has a flanged bottom wall 40B that is pivoted at its lower forward edges on the side frames 33 by means of pivot pins or studs 45 that extend through aligned openings in the opposite side frames and through lugs 45L that are fixed on the hopper 40. At its rear edge, the bottom wall 30B has a depending rear support rod 46 pivoted thereto in the same general manner as shown in the aforesaid Anderson patents, and this rod 46 extends downward past the rear frame element 32R of the frame 32 and is arranged to be adjustably connected to the frame member 32R by means including an adjusting screw 47. This enables the angle or slope of the wall 40B to be adjusted since this is necessary in order to attain proper feeding of the different kinds of sheets and the like. The bottom wall 40B carries a pair of adjustable side walls 40S that may be adjusted for engagement with sheets S of different widths.

The sheet separation in the top feed operation of Figs. 3 to 7 is attained by an intermittently operated rubber covered feed roll 50 and a cooperating rubber retard roll 51 as shown particularly in Figs. 3 to 6, and these two rollers have the same general form and relationship as shown in the aforesaid Anderson patents. The retard roll 51 is carried by a support bracket 51B which in turn is adjustably supported on a transversely extended support bar 55 that is of square cross section, and in operation the roll 51 is non-rotatable and accomplishes its function by a frictional retarding action. The bracket 51B is removably clamped on the bar 55 by means including a clamping screw 51S, as shown in Fig. 5. The square cross shaft 55 also serves as a mounting or anchoring means for the ends of the hold-down strips 36 which have clamping brackets 36B associated therewith and with the bar 55 as shown in Fig. 4. The cross shaft 55 is removably positioned between the opposite side frames 33 by means of clamping screws 55C, Fig. 7, so that the square shaft 55 may be removed, as will be hereinafter described, in converting the feeder from top feed to bottom feed operation.

The feed roll 50 is also removably mounted, and as shown in Figs. 3 to 6, this feed roll is removably secured on a transverse rotatable shaft 58 which is in itself removable from the basic unit 31 when conversion of the machine to bottom feed is desired. As shown in Fig. 6, the shaft 58 may be inserted from the right through the right-hand side frame 33 until the left-hand end of the shaft 58 extends into a projecting stationary bearing sleeve 59. The left-hand of the shaft 58 has a transverse slot 58S that is adapted to drivingly engage a tongue 58T that is formed on a stud shaft 60 so that the shaft 58 may be rotated by rotation of the shaft 60. The stub shaft 60 is in the present instance rotated through a train of gears from a drive gear 61, and this is generally like the drive provided in the aforesaid Anderson patents except that in the aforesaid Anderson patent, a sprocket and chain arrangement was employed rather than a chain of gears. The drive gear 61 is in turn operated in a step-by-step or intermittent manner by a rocker 63 that is fixed on the rock shaft 42, and an operating pawl 64 on the rocker 63 which engages a ratchet 61R that is fixed to the gear 61, it being noted that gear 61 is freely rotatable upon the shaft 42. The rocker 63 also acts through a link 37L, Fig. 1, to operate the jogger 37, as described in said patents.

Figure 1:
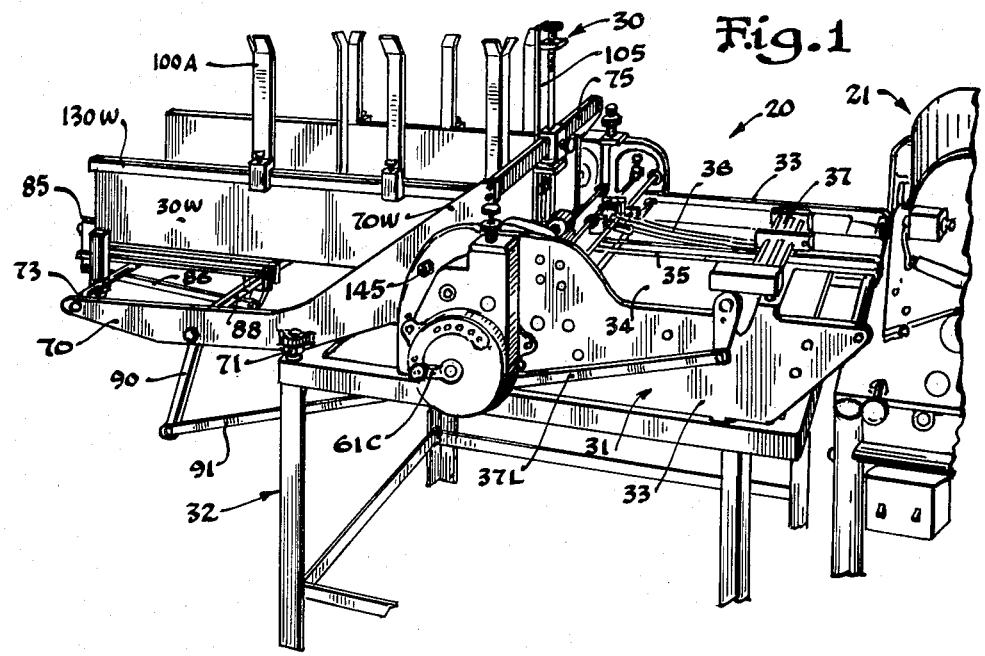
Fig. 1 is a side elevational view of a sheet feeder embodying the features of the invention, the feeder in this view being arranged for bottom feed operation.

Thus, when the rock shaft 42 is moved through a rocking stroke, the stub shaft 60 and the shaft 58 are advanced through a predetermined arcuate movement which of course is imparted to the separator roll 50. A control lever 61C, Fig. 1, is provided for disengaging the pawl 64 when the feed roll 50 is to be disabled and in practice this lever is also used to vary the arc of engagement of the pawl 64 and thus control the feed stroke of the roll 50. The separator roll 50 has a projecting end collar 50C that may be fixed on a set screw 50S on the shaft 58 and this releasable connection is utilized not only in locating the feed roller or separator roll 50 laterally with respect to the sheets to be fed, but also in the course of mounting or removal of the shaft 58 and the roll 50. The shaft 58 is maintained in its driving relation with the stub shaft 60 by means including a retaining collar 66 that is fixed by a set screw 66S on the shaft 58 near the right-hand end thereof as viewed in Fig. 6. Preferably an expansive coil spring 67 is located between the collar 66 and the adjacent side frame 33 and this serves to maintain the tongue and slot driving connection in engagement.

With the top feed construction that is shown in Figs. 3 to 6, the operation of the feeder as a top feed installation is the same as described in the aforesaid Anderson patents, and yet the hopper and sheet separating elements may be readily removed when desired to enable the bottom feed unit to be associated with the basic unit 31 for operation by the rock shaft 42 of the basic unit.

When the feeder 20 is to be converted from top feed operation to bottom feed operation, the hopper 40 is removed by removing the pivot studs 45 and releasing the clamp 47. The square shaft 55 is then removed by removal of the securing screws 55C, and this of course removes the retard roll bracket 51B and any hold-down devices 36 that may be carried on the square shaft 55. Finally, the feed roll 50 and the shaft 58 are removed, and this is accomplished by releasing the adjusting screws 50S and 66S and moving the shaft 58 to the right through the right-hand side frame 33, Fig. 6. The basic unit 31 is then in condition for operative association of the bottom feed unit 30 therewith.

The bottom feed unit 30 is illustrated in Figs. 1, 2, and 8 to 16 of the drawings, and is made-up primarily from a pair of side frames 70 that are rigidly interrelated or connected as will be described, and are adapted to be put into position with their forward ends extended into the space between the main side frames 33 and in engagement with the respective side frames 33, and when thus positioned a securing stud 145 is extended through the two side frame openings that had previously received the pivot studs 45. This accurately locates the forward ends of the side frames 70 in the desired relationship with respect to the basic unit 31, and leveling screws or supports 71 are provided on the outer sides of the two side frames 70 for engagement with the rear bar 32R of the table 32, thus to accurately locate the side frames and provide for support of the rear portions thereof which overhang the table 32 to a considerable extent, as will be evident in Figs. 1 and 2.

The side frames 70 of the bottom feed unit 30 are connected at their rear ends by a spacer bar 73, and the side frames 70, as will be evident particularly in Figs. 8 and 10, extend forwardly in a generally horizontal direction and at about the point where the leveling devices 71 are provided, the side frame 70 extends upwardly so as to provide diverging arm portions 70U and 70L. The arm portions 70L terminate in a forward end that is substantially at the level of the rear spacer bar 73, and are interconnected by a lower front spacer bar 74L. The upwardly diverging arms 70U extend upwardly at a substantial angle and terminate considerably above the forward ends of the arms 70L, and the two upwardly diverging arms 70U are connected at their upper ends by a cross bar 75 that is rectangular in cross section and has its major dimension disposed in a vertical plane. The rigid assembly that is thus provided by the interconnected side frames 70 serves as a support for the other elements that are to make up the sheet separating means, the positioning hopper and portions of the driving means for the sheet separating means.

Thus the sheet separating means are provided by a reciprocable shuttle 77 that is mounted for reciprocation in a shuttle guide 78 that is located somewhat above and supported on the spacer bars 73 and 74. The guideway 78 comprises a pair of spaced flat bars 79 disposed in vertical planes, and at their rear end, these bars 79 have a mounting block 80 fixed therebetween. This mounting block 80 projects downwardly below the bars 79, and the rear spacer bar 73 extends slidably through the block 80 so that the block 80 may be laterally adjusted along the spacer bar 73. A clamping screw 80S is utilized to secure the block 80 in any desired position of adjustment. At its forward end the guideway 78 has a mountinng block 180 secured between the bars 79, and this mounting block 180 extends downwardly and is adjustably mounted on the spacer bar 74 in the same general manner as the block 80, there being a securing set screw 180S associated with the block 180 for fixing the front end of the guideway in position on its supporting rod 74.

The shuttle 77 is supported between the two bars 79 on an actuating rod 82 that extends slidably through the spacer blocks 80 and 180, and the shuttle 77 may be fixed on the rod 82 at any longitudinal position by means of a clamping screw structure 83 that is shown in particular detail in Figs. 14 and 15. Thus the shuttle 77 has a clamping sleeve 83A mounted therein and having an arcuate surface 83B with the side of the rod 82 where the rod extends through the shuttle. A screw 83C extends downwardly through the shuttle 77 and is threaded into the sleeve 83A so that by operation of the screw 83C the sleeve 83A may be drawn upwardly so as to clamp the arcuate surfaces 83B to the actuating rod 82. The shuttle 77 of course is arranged to engage the rear edge of a sheet, carton or the like in the course of reciprocation of the shuttle, and since the thickness of the work that is to be thus engaged may vary to a considerable extent, the shuttle 70 is arranged therefore to have a work-engaging lip or bar 77L that is vertically adjustable so as to project to different extents above the upper surface 77U of the shuttle. In this respect it should be noted that the upper surface 77U is located in substantially the horizontal plane of the upper edges of the bars 79, and the stack of sheets or the like normally rests on these upper edges of the bars 79.

As shown in Figs. 14 and 16, the lip or bar 77L is disposed in a transverse slot 177S in the shuttle 77 and has an angularly formed forward edge that may be adjusted as to the amount of desired projection above the upper surface 77U. Such adjustment is attained by a pair of leveling screws 177L that extend downwardly through opposite ends of the lip 77L and engage the bottom of the groove 177S. Thus the work-engaging element may be raised or lowered or actually may be tilted in a lateral sense where variations of work thickness make this desirable. After the lip 77L has been adjusted to the desired position, it is clamped in place by a clamping screw 177C that extends downwardly through the member 77L and is threaded into the lower portions of the shuttle 77. The screw 177C thus is effective to clamp the lip 77L in any desired adjusted position that has been established by operation of the leveling screws 177L.

Figure 13:
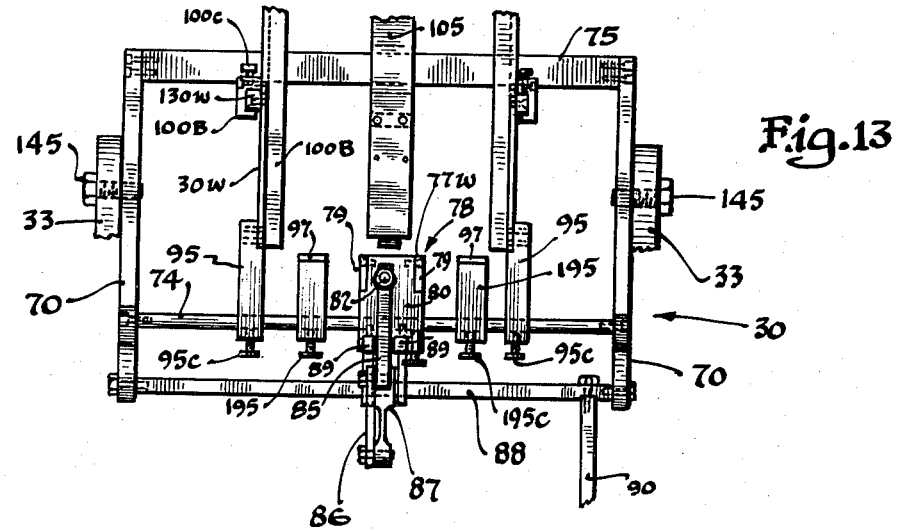
Fig. 13 is a rear elevational view of the bottom feed hopper.

It has been pointed out that the actuating rod 82 is adapted for reciprocation, and the means for accomplishing this are mounted primarily on the unit 30, but are adapted for quick connection with the rock shaft 42 for operation thereby in timed relation to the printing machine. Thus, as shown in Figs. 8, 10 and 13, the rear end of the rod 82 has a transmitting bar 85 extended downwardly therefrom, and a link 86 extends downwardly and forwardly from the lower end of the bar 85 and is pivoted to the lower end of an operating arm 87. This operating arm 87 is mounted on a rock shaft 88 that is of square cross section, the rock shaft 88 being extended between the side frame 70 somewhat forwardly of the rear end of the side frames. Thus the shuttle may be operated by rocking movement of the square rock shaft 88, and the operating arm 87 is adapted to be adjusted transversely of the unit 30 and along the shaft 88. A clamping screw 87C may be used to fix the arm 87 in any desired position of adjustment. In order that a lateral adjustment of the arm 87 may be readily coordinated with lateral adjustments of the guideway 78, the block 80 has a pair of locating bars 89 fixed thereto so as to project both forwardly and rearwardly therefrom. Thus, the transmitting bar 85 is located between the projecting rear ends of the bars 89, while the upper portion of the arm 87 is located between the forwardly projecting ends of the bar 89. This maintains the arm 87 and the bar 85 in the proper relationship during adjustments of the parts.

The shaft 88 is operated through its desired rocking movement by means including an operating arm 90 fixed to and projecting downwardly from the shaft 88, and the lower end of this arm has a rear end of a link 91 pivoted thereto. The other or forward end of the link 91 is adapted to be connected to an operating arm 92 that is clamped in position on the rock shaft 42 of the main unit 31. The arm 92 may be left in position on the shaft 42 at all times, and when the bottom feed unit 30 is put in place, the forward end of the link 91 may be connected quickly to the arm 92 by a pivot screw or stud 93. Hence, whenever the rock shaft 42 of the main unit is operated through a rocking stroke, the shuttle 77 is operated through its feeding stroke in which the lip 77L will engage the rear edge of the lowermost sheet S to advance the same forwardly and into the bight of the pull-out rolls 39U and 39L, as shown in Fig. 10 of the drawings.

As above pointed out the lowermost sheet S in a stack thereof rests on the upper surface of the rails 79 of the guideway, and such a stack of sheets is further confined and supported by means that are removably associated with and mounted on the spacer bars 73 and 74 so that the feeder unit may be adapted quickly and easily for the handling of sheets of different sizes. Thus, as shown in Figs. 1, 2 and 8 to 13, the unit 30 is provided with a pair of side walls 30W that may be mounted on opposite sides of the shuttle guideway 78. The walls 30W are made in right and left hand embodiments and each such wall has a rear mounting block 95 and a front mounting block 96 connected on its outer side and extended downwardly therefrom. At their lower ends the mounting blocks 95 and 96 have forwardly opening mounting slots 95S and 96S which may be engaged respectively with the spacer rods 73 and 74 so as to embrace and be supported on such rods. When thus engaged, the mounting blocks 95 are held in place by clamp screws 95C, Fig. 13. Similar clamping arrangements are provided on the forward mounting blocks 96 and it will, of course, be apparent that the side walls 30W may be located in any desired position laterally with respect to the guideway 78 and the side frame 70.

In some instances, where relatively narrow sheets are to be fed, the side walls 30W are put into position relatively close to the sides of the shuttle guideway 78, but in other instances the width of the sheets requires substantial spacing between the guideway 78 and the side walls 30W. In those instances, removably mounted skid bars 97 are put into position between the shuttle guideway and the side walls. These skids are supported on the rods or cross bars 73 and 74 in much the same manner as the side walls 30W. Thus, mounting blocks 195 are fixed to the opposite ends of the skids and are slotted to embrace the respective spacer bars 73 and 74 in the manner above described with respect to the side walls 30W, and clamping screws 195C are provided for securing the skids 97 in the desired locations on the supporting bars. It will be observed that the upper surfaces of the skids 97 are located in the same plane as the upper surfaces of the shuttle guideway 78 so that these elements cooperate in defining the bottom of the hopper. The sheets S may thus be put into position between the adjustable side walls 30W so as to be supported by the guideway 78 alone or in combination with skids 97 where this is required.

In many instances it is desirable to stack the sheets S in relatively high stacks and to enable this to be done, upward extension bars 100 are provided that may be adjustably mounted on the side walls 30W. In order to enable this to be readily accomplished, each of the side walls 130 has a mounting bar 130W fixed thereto along its upper edge and on the outer surface of the wall, and means are provided on the upper extension bars that will embrace and will be adjustable along the mounting bars 130W. Thus, as will be evident particularly in Figs. 1 to 10 and 11, each upward extension bar has a U-shaped mounting block or member 100M fixed on its lower end in position to embrace and be slidable along the mounting bar 130W and when thus positioned, the upward extension bar projects upwardly as a continuation of the inner surface of the wall 30W. A clamping screw 100C is provided in each mounting block 100M for securing the extension bar in the desired adjusted position.

Two forms of upward extension bars are preferably provided, as will be evident in Figs. 9 and 10. Thus at the front and rear edges of a stack of sheets, it is often desirable to provide for engagement of such front and rear edges to assure proper alignment of the sheets in the stack, and while the members 100 merely constitute upward extensions of the inner surface of the wall, those extensions used at the front and rear edges of the stack are identified as extensions 100A and are provided with inwardly and downwardly extending flanges 100B as indicated in Figs. 8 and 9. Thus, the inward flanges 100B extend downward to points slightly above the level of the upper face of the shuttle guideway 78, as shown particularly in Fig. 13 of the drawings.

A wide variety of sheet sizes may thus be accommodated in the hopper of the bottom feed unit 30, and in the feeding operation where the shuttle 77 moves through its short reciprocating stroke, additional means are provided in the front or discharge end of the hopper for assuring that only the lowermost sheet S will be advanced to the feed rolls 39U and 39L. This structure comprises a gauge bar 105 which is mounted on the spacer bar 75 for lateral adjustment so that it may be arranged in the proper central relationship with respect to the stock of sheets, and for vertical adjustment so that the lower or gauging end of the gauge bar 105 may be set above the level of the guideway 78 in an accurately determined amount so as to thereby assure accurate separation and feeding of the sheets.

In providing for the aforesaid adjustable mounting of gauge bar 105, a pair of spaced lugs 106 are provided on the forward face of the gauge bar and between these two lugs 105 and 106, a threaded adjusting screw 107 is rotatably mounted. The adjusting screw 107 is threaded through the upper lug 106 and extends freely through the lower lug 106 and an intermediate locating block 108. The block 108 has a slot in its rear surface whereby this block may embrace the rectangular bar 75 in a fairly snug relationship. Snap rings 108S are provided on the shaft 107 to engage the upper and lower surfaces of the block 108. Thus, by rotating the adjusting screw 107, the gauge bar 105 may be adjusted up and down so as to locate the lower or effective end thereof at the desired level. The upper lug 106 has a clamp screw 106C therein for clamping the screw 107 in adjusted position, and to prevent damage to the threads, an intermediate leather strip may be used between the screws 106C and 107. The locating block 108 has a clamping screw 109 therein which extends through the block in such a position that it may be tightened against the bar 75, and this enables the gauge bar to be fixed in any desired position laterally of the stack of sheets.

The gauge bar 105 under the present invention has a unique form and construction whereby the lower or gauging end of the gauge bar acts with a frictional retarding action in the event that there is a tendency for a second sheet S to move out of the hopper. As shown particularly in Figs. 11 and 12, this frictional arrangement is provided by a strip of relatively stiff rubber that is identified as strip 105B, and this strip extends downwardly along the forward face of the gauging bar, and in its lower portion the forward face of the bar is cut away at 104C so that the strip 105B is bent somewhat forward and then extended downwardly beyond the lower end of the rigid bar 105. The rubber strip 105B is preferably backed up by a flat spring steel strip 105D and the strips 105B and 105D may be adjusted vertically with respect to each other and with respect to the gauge bar 105 to establish the desired gauging dimension and the desired degree of resilience at the downwardly projecting end of the strip 105D. Such adjustment may be maintained by a clamp 105E and a clamp screw 105F which press the strips 105B and 105D against the bar 105 with a clamping action.

From the foregoing description it will be evident that the present invention provides a sheet feeder that is adapted for quick and easy conversion to either bottom feed or top feed operation, and it will also be evident that such conversion is accomplished in such a way that the operation of the jogger is not disturbed and in such a way that an operating element on the basic portion of the feeder remains in its operating relation and serves to drive the sheet separator means of either the bottom feed or the top feed arrangement.

It will also be apparent that the present invention provides a new and improved bottom feed sheet feeder that is particularly adapted for use with a wide range of articles or sheets.

Thus, while we have illustrated and described a preferred embodiment of our invention it is to be understood that changes and variations may be made by those skilled in the art without departing form the spirit and scope of the appending claims.

We claim:

1. In an article feeder for selective use in feeding articles from either the top or bottom of a stack, a frame, a constantly driven article conveyor mounted on the frame, and having input and output ends between which articles may be conveyed longitudinally of the conveyor, pull out rollers mounted on said frame at the input end of the conveyor for feeding individual articles to the conveyor, a rock shaft mounted on said frame transversely with respect to the conveyor, a top feed hopper, an article separator adapted for mounting on said frame for top feeding of articles from the top feed hopper one by one to said pull out rolls when said article separator is intermittently actuated, a bottom feed hopper having an article separator in the form of a reciprocable shuttle adapted for mounting on said frame for bottom feeding of articles from the bottom feed hopper one by one to said pull out rolls when said shuttle is intermittently reciprocated, and means for selectively mounting said top feed and bottom feed hoppers on said frame and for connecting the respective article separators to said rock shaft for intermittent operation thereby when the related hopper is mounted in position on said frame.

2. In an article separator and feeder unit, a frame having a constantly driven article conveyor having input and output ends, pull out rollers mounted on said frame at the input end of the conveyor for feeding individual articles into the conveyor, a transverse rock shaft mounted on said frame, a top feed hopper and intermittently operable sheet separating means adapted for mounting on said side frames for feeding articles one by one from the top of a stack in the hopper to said pull out rolls when said separating means are intermittently actuated, a bottom feed hopper having separating means comprising a reciprocable shuttle and adapted for mounting on said frame for bottom feeding of articles one by one from the bottom feed hopper to said pull out rolls when said shuttle is intermittently reciprocated, and means for selectively mounting said top feed and bottom feed hoppers on said frame and for connecting the respective separating means to said rock shaft for intermittent operation thereby when the related hopper is mounted in position on said frame.

3. In an article feeder, a support having side frames, a constantly driven article conveyor mounted between said side frames and having input and output ends, pull out rollers mounted on said side frames at the input end of the conveyor for feeding individual articles into the conveyor, a rock shaft extended between said side frames, a top feed hopper and cooperative separator and retarder rolls adapted for mounting on said side frames for feeding articles one by one to said pull out rolls when said separator roll is intermittently actuated, a bottom feed hopper having a reciprocable shuttle adapted for mounting on said side frames for bottom feeding of articles from the hopper one by one to said pull out rolls when said shuttle is intermittently reciprocated, and means for selectively mounting said top feed and bottom feed hoppers on said side frames and for selectively connecting said separator roll and said shuttle to said rock shaft for intermittent feeding operation thereby when the related hopper is mounted in position on said side frames.

4. In an article feeder, a support having side frames, a constantly driven article conveyor mounted between said side frames and having input and output ends, pull out rollers mounted on said side frames at the input end of the conveyor for feeding individual articles into the conveyor, a top feed hopper and separator means comprising cooperative separator and retarder rolls adapted for removable mounting on said side frames for feeding articles one by one to said pull out rolls when said separator roll is intermittently actuated, a bottom feed unit comprising a hopper having separator means in the form of a reciprocable shuttle, said bottom feed unit being formed for removable mounting on said side frames for bottom feeding of articles from the bottom feed hopper one by one to said pull out rolls when said shuttle is intermittently reciprocated, a rock shaft mounted on said support, and means for selectively mounting said top feed and bottom feed hoppers on said side frames and for selectively connecting said separator roll and said shuttle to said rock shaft for intermittent feeding operation thereby.

5. In a sheet feeder, a primary unit including a conveyor table having feed belts thereon and pull out rolls for advancing sheets to said feed belt, and a rock shaft adapted to be rocked intermittently, a top feed hopper and a rotative separator with a cooperating resilient retard member, a bottom feed hopper and a reciprocating separator with a cooperating resilient retard member, and means for selectively supporting said hoppers and retard members on said unit and selectively connecting said separators to said rock shaft for actuation thereby.

6. In feeder for sheets and the like, a pair of side frames disposed in spaced vertical planes, upper and lower front spacer bars rigidly connecting the side frames at one end thereof, a rear spacer bar rigidly connecting the side frames at their other end, a shuttle feed assembly comprising an elongated guideway disposed horizontally and parallel to said side plates and supported for lateral adjustment on said rear spacer bar and said lower front spacer bar, a feed shuttle reciprocably supported and guided by said guideway a reciprocable actuating means connected to said shuttle a hopper including a pair of vertical hopper side walls supported for lateral adjustment on said lower front spacer bar and said rear spacer bar, and a depending gauge plate supported on said upper front spacer bar for lateral and vertical adjustment.

7. A sheet feeder according to claim 6 wherein removable skids are supported on said lower front spacer bar and said rear spacer bar at the level of the guideway, for ready removal when narrow sheets or the like are to be supported in the hopper.

8. In a feeder for sheets and the like, a pair of side frames disposed in spaced vertical planes, upper and lower front spacer bars rigidly connecting the side frames at one end thereof, a rear spacer bar rigidly connecting the side frames at their other end, a shuttle feed assembly comprising an elongated guideway disposed horizontally and parallel to said side plates and supported for lateral adjustment on said rear spacer bar and said lower front spacer bar, a reciprocable actuating rod extended longitudinally of said guideway, a feed shuttle reciprocably supported on said rod and guided in said guideway, means for connecting said shuttle to said actuating rod at any point along said rod, means carried on said side frames for imparting reciprocation to said rod in any laterally adjusted position of said guideway, a pair of vertical hopper side walls supported for lateral adjustment on said lower front spacer bar and said rear spacer bar, vertically extended positioning members disposed along the adjacent faces of said hopper walls for adjustment along said walls, and a depending gauge plate supported on said upper front spacer bar for lateral and vertical adjustment.

9. In feeder for sheets and the like, a pair of side frames disposed in spaced vertical planes, upper and lower front spacer bars rigidly connecting the side frames at one end thereof, a rear spacer bar rigidly connecting the side frames at their other end, a shuttle feed assembly comprising an elongated guideway disposed horizontally and parallel to said side plates and supported for lateral adjustment on said rear spacer bar and said lower front spacer bar, a feed shuttle reciprocably supported and guided on said guideway, reciprocable actuating means extended longitudinally of said guideway for reciprocating said shuttle, a pair of vertical hopper side walls removably supported on said lower front spacer bar and said rear spacer bar, and a depending gauge plate supported on said upper spacer bar for lateral and vertical adjustment.

10. In a sheet feeder, a bottom hopper having a reciprocable shuttle located at the bottom thereof, a pair of hopper walls having smooth inner surfaces disposed adjacent to each other, mounting bars extended along the upper edges of the outer face of said hopper walls, and adjustable extension members adapted for adjustable support on said mounting bars and having clamping means thereon for fixing the same in adjustment, certain of said extension bars having angularly related members extended downwardly from said mounting members and being adapted to be located along the inner faces of said walls for engagement with end surfaces of a stack of sheets.

11. In a sheet feeder, a bottom feed hopper having a reciprocable shuttle located at the bottom thereof, a pair of hopper walls having smooth inner surfaces disposed adjacent to each other, mounting bars extended along the upper edges of the outer face of said hopper walls, and adjustable extension members adjustably supported on said mounting bars and having clamping means thereon for fixing the same in adjustment, and angularly related members on said extension members extended downwardly from said members and located along the inner faces of said walls for engagement with the end surfaces of a stack of sheets.

References Cited in the file of this patent

UNITED STATES PATENTS

| | | |
|---|---|---|
| 1,295,773 | Lesher | Feb. 25, 1919 |
| 1,718,968 | Littlefield | July 2, 1929 |
| 1,919,238 | McCarthy | July 25, 1933 |
| 1,940,487 | Cambell | Dec. 19, 1933 |
| 2,181,211 | Sieg | Nov. 28, 1939 |
| 2,324,523 | Lund | July 20, 1943 |
| 2,401,719 | Braun | June 11, 1946 |
| 2,402,774 | Rice et al. | June 25, 1946 |
| 2,589,600 | Burkholder | Mar. 18, 1952 |
| 2,641,321 | Cruzan | June 9, 1953 |